Jan. 7, 1936.  J. P. SPANG  2,027,002
COOKING APPLIANCE
Filed June 6, 1932   3 Sheets-Sheet 3
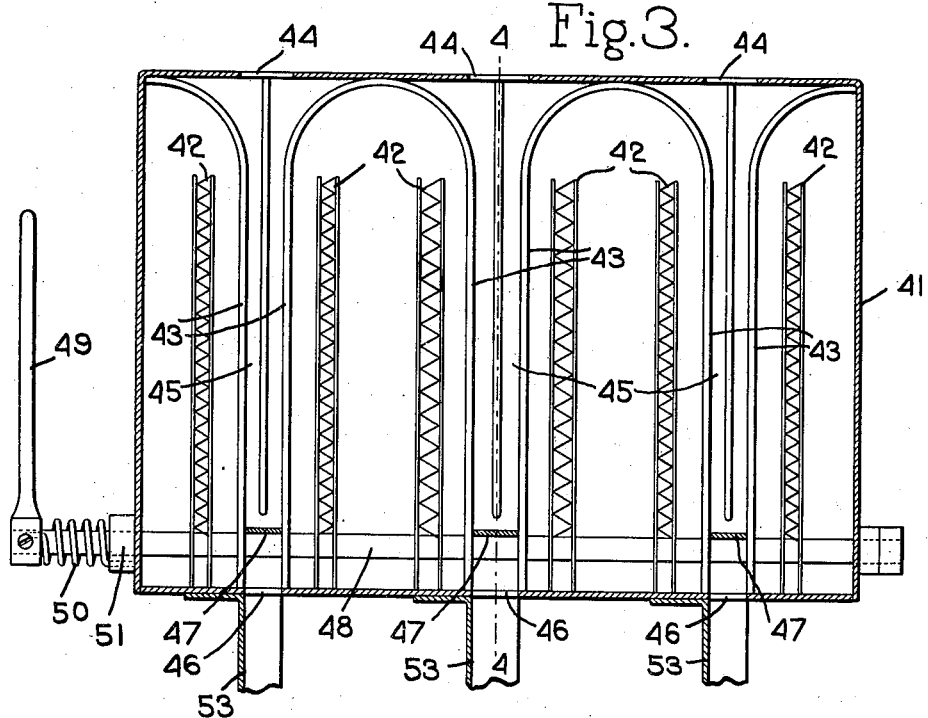
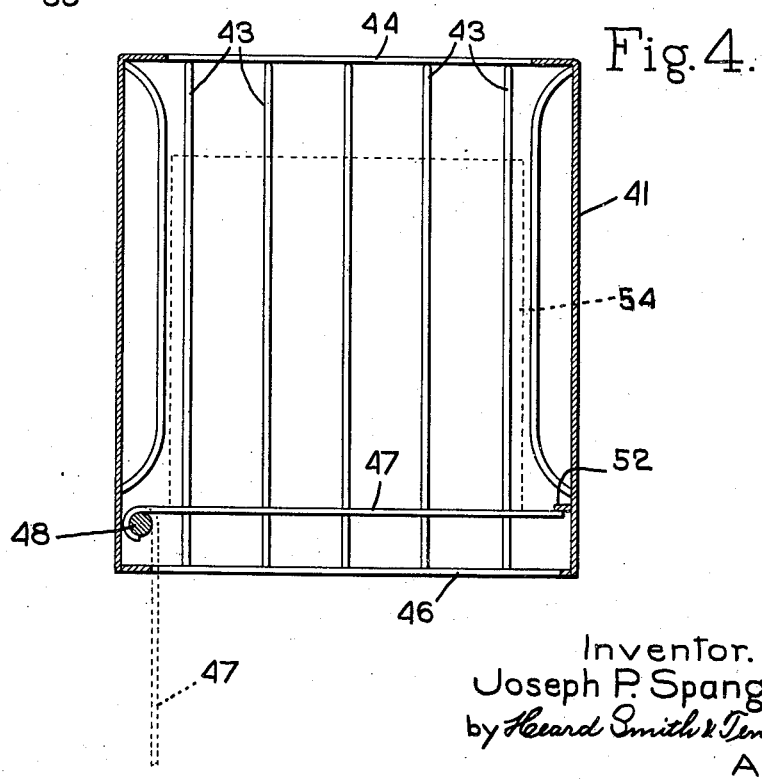
Inventor.
Joseph P. Spang
by Heard Smith & Tennant.
Attys.

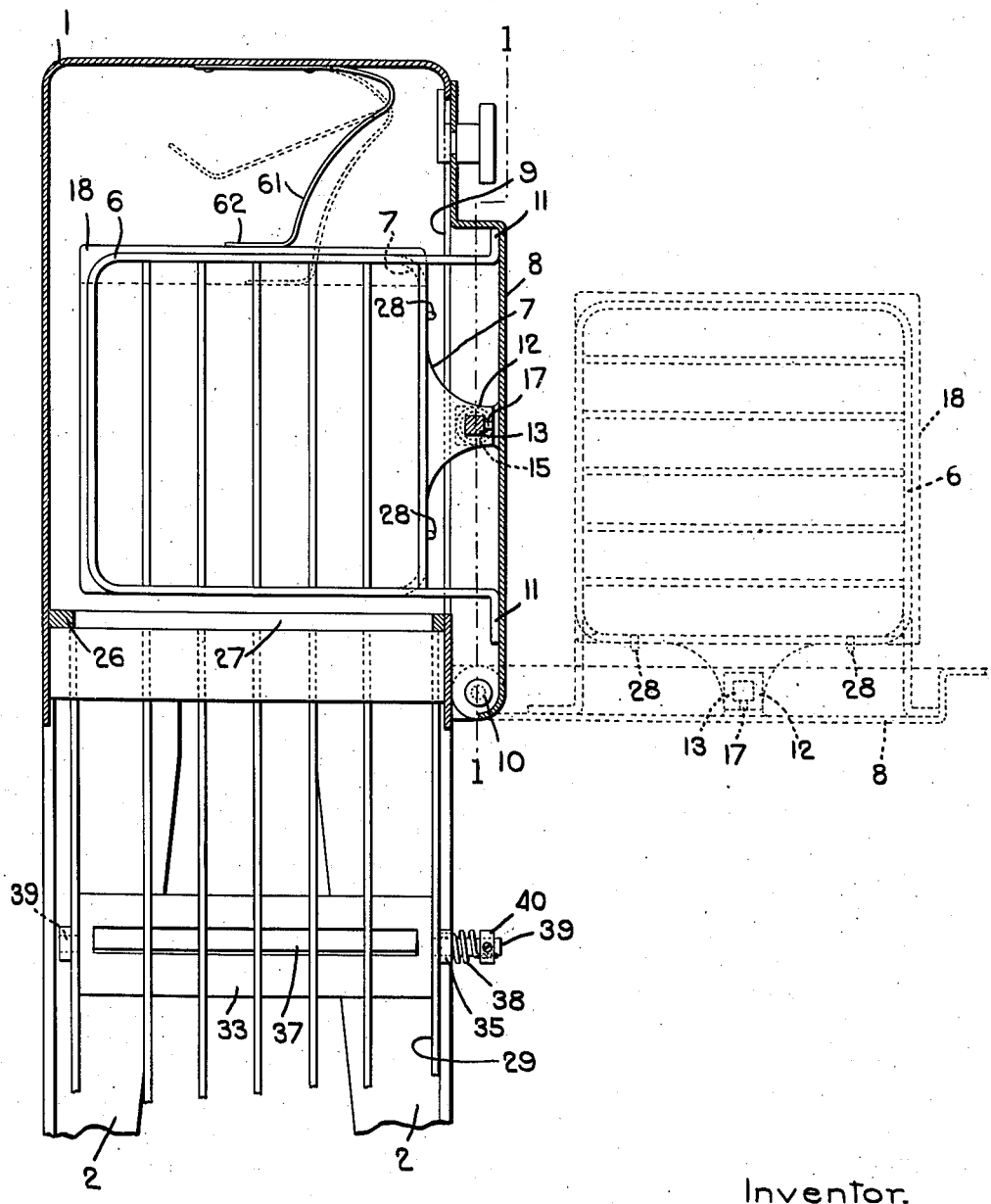

Patented Jan. 7, 1936

2,027,002

UNITED STATES PATENT OFFICE 2,027,002

COOKING APPLIANCE

Joseph P. Spang, Quincy, Mass.

Application June 6, 1932, Serial No. 615,617

19 Claims. (Cl. 53—5)

This invention relates to cooking appliances of the type designed for performing a cooking operation on food in sliced form, such for instance as toasting slices of bread or broiling slices of meat.

One of the objects of the invention is to provide a novel cooking apparatus of this type which comprises a housing within which the sliced food is toasted or broiled, which housing has openings in its bottom together with means for discharging the cooked slice, whether in the form of toasted bread or broiled meat, through said opening.

While the invention is capable of general use where food in slice form is to be toasted or broiled or otherwise cooked yet it is specially useful in the making of meat sandwiches of the kind including a slice of broiled meat between two slices of toast. When used in this manner the two slices of bread and a slice of meat may be placed in the appliance and subjected to the cooking operation simultaneously and when the bread is toasted and the meat broiled the three slices may be discharged through the openings in the bottom of the housing and assembled as a sandwich.

In the preferred form of my invention I provide the device with chutes leading from the openings and which convey the three slices of food going to make up the sandwich into a position in which they are superposed one on the other in sandwich form with the slice of meat between the slices of toast.

The device may also be provided with means for automatically buttering the toast and the meat as they are discharged from the housing. Hence with this apparatus it is possible to make a meat sandwich simply by placing the two slices of bread and the slice of meat in the appliance and then subjecting these slices to the desired toasting or broiling operations and subsequently discharging the toasted or broiled slices from the housing, said slices being automatically buttered and assembled in sandwich formation as they are thus discharged.

In order to give an understanding of the invention I have illustrated in the drawings a selected embodiment thereof which will now be described after which the novel features will be pointed out in the appended claims.

Fig. 2 is a section on the line 2—2, Fig. 1;

Fig. 3 is a sectional view showing a modified form of the invention;

Fig. 4 is a section on the line 4—4, Fig. 3;

Figure 1:
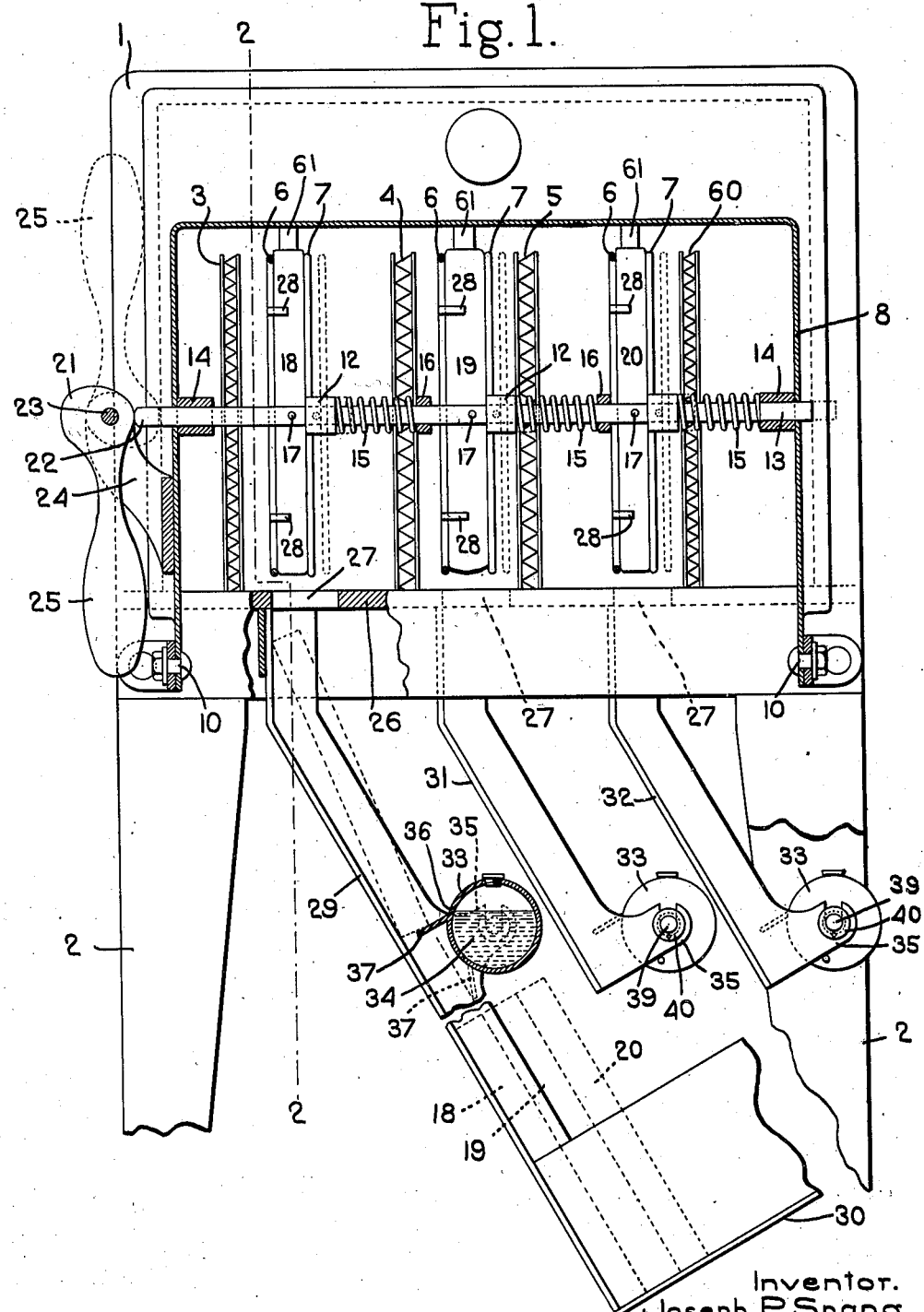
Fig. 1 is a view partly in section illustrating a device embodying my invention, said section being on the line 1—1, Fig. 2.

My improved cooking appliance comprises a housing within which the cooking is done, which housing has discharge openings in its bottom, means for supporting food in slice form over said openings, heating elements within the housing for toasting or cooking the slices thus supported, and means for discharging the cooked slices through said openings.

Referring first to the construction shown in Figs. 1 and 2, 1 indicates a suitable housing within which the cooking is performed and this housing is shown as supported on legs or supports 2.

Situated within the housing are heating elements herein shown as electric coils by which the cooking or toasting operation is performed. Any desired number of such coils may be used depending on the size of the apparatus. The construction herein shown is one adapted to cook three slices simultaneously and there are four coils used which are designated 3, 4, 5 and 60 respectively. These coils may be connected to the supply circuit through any suitable connection (not shown).

Means are provided for supporting slices of food, such for instances as slices of bread to be toasted or slices of meat to be broiled, in proper relation to these heating elements and in the construction shown in Figs. 1 and 2 the slice-supporting means comprises means for clamping the slices in proper position. Each slice-clamping means comprises two clamping elements 6 and 7 each in the form of a grid and between which the slice is clamped.

In the construction shown in Figs. 1 and 2 the housing is provided with an open front 9 adapted to be closed by a door 8 which is hinged to the housing at 10 and the slice-clamping members are carried by the door 8. The clamping elements 6 are rigidly secured to the door, each element being shown as having the feet portions 11 which are rigidly secured to the inside of the door. The clamping elements 7 are also carried by the door but are mounted for movement toward and from the clamping elements 6. Said clamping elements 7 are carried by a bar 13 which is mounted in bearings 14 secured to the door. The bar 13 is square in cross section and each clamping member 7 is provided with an extension 12 having a square aperture through which the bar extends. Since the bar is square in cross section it is prevented from turning in its bearings 14 and the flat-sided construction of the bar 13 together with the square or flat-sided openings in the extensions 12 prevent the clamping members 7 from turning relative to the bar 13 but allow said members to slide on the bar in the direction of its length.

Each member 7 is acted on by a spring 15 which tends to urge it toward the corresponding clamping member 6. Each spring 15 encircles the bar 13 and bears at one end against the extension 12 of a clamping member 7 and at the other end against a collar 16 fixed to the bar. This bar 13 not only forms a support for the movable clamping members 7 but also provides means for separating the clamping members of each pair to provide for placing a slice of bread or meat between the clamping members, or for releasing said slice after it has been toasted or broiled. For this purpose the bar 13 is slidable longitudinally in its bearing 14 and is provided with pins or projections 17 adapted to engage the extensions 12 of the clamping members 7 as the bar is moved to the right in Fig. 1.

Fig. 1 shows in full lines slices of food held by the food-clamping elements, said slices being indicated at 18, 19 and 20 respectively. To unclamp the slices the bar 13 is moved to the right into the dotted line position, during which movement the pins 17 will engage the extensions 12 of the clamping members 7 and move them to the right into the dotted line position against the action of the springs 15. For thus actuating the bar 13 I have provided a cam member 21 adapted to engage the end 22 of the bar 13 which projects through the door, said cam member being pivoted at 23 on a bracket 24 secured to the door. This cam is provided with a handle 25 by which it may be operated.

When the handle is in the full line position Fig. 1 the end 22 of the bar 13 rests against the low portion of the cam 21 and by turning said handle into the dotted line position the cam will move the bar 13 to the right thereby separating the clamping members 7 from the members 6 and releasing the slices 18, 19 and 20.

The bottom 26 of the housing 1 is provided with openings 27 through which the slices may be discharged. There is one such opening 27 beneath each pair of clamping members 6 and 7 so that when the clamping members 7 are separated from the members 6 the slices 18, 19, 20 will be released and may then gravitate through the openings 27.

In using the device the door 8 will be opened into the dotted line position, Fig. 2, and since the clamping members are secured to the door this opening movement of the door will withdraw them from the casing and place them in the position shown in Fig. 2. The handle 25 may then be manipulated to separate the clamping members and the slices of food are then placed in position between the clamping members. Each stationary clamping member is shown as having rests or supports 28 on which the slice is temporarily supported when it is placed between the clamping members. After the slices have been placed between the clamping members the handle 25 may be swung into its full line position Fig. 1 thereby allowing the springs 15 to move the clamping members 7 toward the clamping members 6 with the result that each slice will be yieldingly clamped between the two clamping members. This arrangement will readily accommodate slices of different thicknesses as each spring 15 will hold its clamping member 7 yieldingly against the slice regardless of the thickness. The door may then be swung in its closed position which will place the slice in a toasting or broiling relation with the heating elements 3, 4, 5 and 60. When the slices have been subjected to heat for a sufficient length of time the handle 25 may be swung into the dotted line position Fig. 1 while the door is still closed thereby unclamping the slices and allowing them to gravitate through the openings 27.

I will preferably provide guiding chutes which are associated with the openings 27 and which guide the gravitating slices of food into a suitable receptacle. Associated with the right hand opening 27 is an inclined chute or guide 29 which receives the slice 18 when it is unclamped as shown by dotted lines Fig. 1 and which leads to a suitable receptacle 30.

The center opening 27 has associated therewith another guide or chute 31 and the right hand opening has associated therewith a guide or chute 32. Both of the chutes 31, 32 terminate somewhat above the receptacle 30 so that the slices 19 and 20 will be deposited from the chutes 31, 32 into the receptacle 30.

The device illustrated in Figs. 1 and 2 is specially designed for use in making a toasted meat sandwich comprising two slices of toast with a slice of broiled meat between them. In doing this the two slices of toast will be placed in the two end slice-supporting devices as indicated at 18 and 20 and the slice of meat will be placed in the center slice-supporting device as indicated at 19.

A greater amount of heat is required to properly broil the slice of steak than to toast a slice of bread and in making a toasted steak sandwich it is desirable to have the broiling of the steak completed at approximately the same time that the bread is correctly toasted. In order to provide for this I propose to make the heating elements 4 and 5 by which the steak is broiled of greater heat-producing capacity than the other heating elements 3 and 60 and in order that these larger heating units or elements 4 and 5 may not toast the side of the slice of bread facing them too rapidly I propose to place them closer to the center clamping members than to the outside clamping members. The arrangement will be such that the toasting effect of the larger heat-producing element 4 on the slice 18 will be substantially the same as that of the smaller element 3 due to the fact that the element 4 is a greater distance from the slice than the element 3. With this arrangement, therefore, the slice of meat and the slice of toast may be placed in the device at the same time and the toasting and/or broiling operation on each will be completed at approximately the same time.

When the toasting is done the lever 25 may be thrown into the dotted line position thereby unclamping the three slices and allowing them to gravitate through the opening 27 into the receptacle 30. This receptacle is arranged to receive the slices in an inclined position and because of its relation to the chutes the three slices will be deposited in the receptacle in a superposed relation as shown in dotted lines Fig. 1 with the meat slice 19 between the two slices of toast, which is the correct relative position of these slices for making a sandwich.

I have also provided means for buttering the slices as they gravitate into the receptacle 30. This is herein accomplished by providing each of the chutes 29, 31 and 32 with a receptacle 33 adapted to hold melted butter 34. Each receptacle is in the form of a drum which is mounted to turn about its axis in suitable bearings 35 carried by the chutes, and for this purpose each receptacle is provided at each end with a trunnion 39 which finds bearing in the bracket.

Each receptacle is provided with a delivery slot 36 extending from one end to the other thereof and with a lip 37 adjacent and immediately below the slot. These lips 37 extend into the path of the slices gravitating downward on the corresponding chute. Each receptacle is normally held in its upright position shown in Fig. 1 through the medium of a spring 38 which encircles one of the trunnions 39 and is secured at one end to the bracket 35 and at the other end to a collar 40 fast on the trunnion.

When a slice gravitates down any chute, the lower edge of the slice will engage the lip 37 and the momentum of the moving slice together with its weight will through such engagement turn the drum into the dotted line position of the left hand drum in Fig. 1 and the drum will remain in this position while the slice of toast is passing the lip 37. When the drum is in this position the melted butter will flow out through the delivery slot 36 and thus be applied to the toast. The same kind of buttering device may be used with the central chute 31 for buttering the slice of meat and if desired with the chute 32 to apply butter to the slice 20 although for making a sandwich it is not necessary to butter the slice 20.

With this device, therefore, the three slices going to make up the sandwich may be placed in the receptacle and when they are thoroughly toasted or broiled they may be automatically buttered and delivered into the receptacle 30 in sandwich formation.

The springs 38 controlling the drums 33 will preferably be adjusted so as to just overbalance the weight of the lip 37. Each drum is thus delicately balanced so that a slight pressure on its lip 37 will be sufficient to turn it into the dotted line position Fig. 1. When, however, the pressure on the lip is relieved, as will occur after the slice of toast has passed the lip, the spring will function to return the drum to its normal position.

The device illustrated in Figs. 1 and 2 is further provided with means for applying a downward pressure on each slice when it is in its cooking or toasting position. The purpose of this device is to ensure that the slices will not stick to the clamping members after the clamping pressure has been released. Such device is herein shown in the form of spring arms 61, there being one such spring arm for each slice-clamping member. These spring arms are shown as secured to the top of the housing 1 and as having a foot portion 62 adapted to rest against the top edge of the slice and apply a downward pressure thereto. When the door with the slices supported thereon is closed the slice will engage the arms 61 and force them back into the upper dotted line position Fig. 2 to allow the door to be closed and when the door is closed the foot portions 62 of the arms will bear against the slices and the arms will be slightly flexed so that a downward pressure is applied to the slices. As soon as the slices are unclamped this downward pressure initiates the gravitational movement of the slices.

The lower dotted lines of the arm 61 in Fig. 2 shows the normal position of the arm while the full lines show its position when resting on the slice of toast and when placed under some tension. These springs 61 will serve to loosen the slices from the clamping members in case they should stick or adhere thereto due to the cooking operation and said arms thus ensure that the slices will gravitate through the openings 27 when the clamping pressure is relieved.

In Figs. 3 and 4 I have shown a somewhat different embodiment of the invention in which the slices to be toasted are introduced into the receptacle through openings in the top but may be delivered from the receptacle after having been toasted or broiled through openings in the bottom as above described.

In the embodiment shown in these figures the housing within which the cooking is done is indicated at 41 and it has located within it a plurality of heat-producing elements indicated at 42, such elements being arranged in pairs and the elements of each pair being adapted to receive between them a slice to be toasted or broiled. The device shown in Figs. 3 and 4 is also provided with guards or retaining members 43 arranged in pairs, the members of each pair providing a space 45 between them adapted to receive a slice of bread or meat to be toasted or broiled. There is a pair of such guard members between each pair of heating units.

The housing 41 is shown as having openings 44 in its top which are situated directly above the spaces 45 so that the slices to be toasted or broiled may be dropped into the spaces 45 through the openings 44. The housing 41 is also provided with discharge openings 46 beneath the spaces 45 and through which the slices are discharged after being toasted or broiled. Each space 45 is provided with a supporting member 47 on which the slice 48 rests as indicated in dotted lines in Fig. 4. These supporting members 47 may be swung downwardly through the openings 46 as shown by dotted lines Fig. 4 in order to discharge the slice through said opening. These supporting members 47 are shown as secured to a shaft 48 mounted for rotation in the casing and the shaft is provided with a handle 49 by which it may be operated.

The arms 47 are normally held in their operative position shown in Figs. 3 and 4 through the medium of spring 50 which encircles the shaft 48 and is secured at one end to the bearing 51 for the shaft and at the other end to the arm or handle 49.

52 indicates a stop strip located within the housing and which limits the upward or spring-impelled swinging movement of the members 47 and serves to hold them in their proper operative position.

In using this device the slices to be toasted are deposited into the housing through the openings 44, said slices being supported on the supporting members 47. When the slices are properly toasted or broiled the arm 49 is actuated to swing the supporting members 47 downwardly through the openings 46, which operation will permit the slices to gravitate through the openings. Each opening may have a chute 53 associated therewith, with chutes are similar in construction to the chutes 29, 31, 32 shown in Fig. 1 so that as the slices are discharged through the openings 46 they will be delivered into a receptacle in superposed or sandwich formation.

I claim:—

1. An appliance for toasting or cooking food in slice formation comprising a housing having a plurality of separate unobstructed openings in its bottom, a pair of slice-clamping members to support a slice stationarily within the housing over each opening, a spring for holding each pair of clamping members in clamping engagement with the slice, heating elements within the housing arranged to toast or broil said slices while thus stationarily supported, and means common to all the pairs of slice-clamping members to open simultaneously, whereby said slices gravitate through said openings.

2. A device of the class described comprising a housing having openings in its bottom, slice-supporting means for supporting a slice over each opening, means to toast or broil the slices thus supported, means providing for discharging said slices through said openings, a receptacle below the openings, and slice-guiding means extending from each opening to the receptacle and constructed to deliver the slices into the receptacle in superposed parallel relation.

3. A device of the class described comprising a housing having a plurality of openings in its bottom, slice-clamping means for supporting simultaneously a slice over each opening, means to toast or broil the slices thus supported, means to release the clamping means whereby said slices are discharged through said openings, a receptacle, slice-guiding means for delivering the slices from the various openings into said receptacle in superposed relation.

4. A device of the class described comprising a housing having openings in its bottom, a pair of spring-actuated slice-clamping elements for each opening, each pair of elements adapted to clamp a slice between them and support it stationarily in vertical position over the corresponding opening, means for toasting or broiling the slices while thus stationarily supported, and means common to all the pairs of clamping elements to separate the elements of each pair against the action of its spring thereby allowing the slices to gravitate through the openings.

5. A device of the class described comprising a housing having unobstructed openings in its bottom, a pair of slice clamping elements for each opening, each pair of elements adapted to clamp a slice between them and support it in vertical position over the corresponding opening, means for toasting or broiling the slices thus supported, a receptacle, and slice-guiding means to deliver said slices from the various openings into the receptacle in superposed relation.

6. A device of the class described comprising a housing having openings in its bottom, a pair of slice-clamping elements for each opening, each pair of elements adapted to clamp a slice between them and support it in vertical position over the corresponding opening, means for toasting or broiling the slices thus supported, a receptacle, slice-guiding means to deliver said slices from the various openings into the receptacle in superposed relation.

7. A device of the class described comprising a housing having openings in its bottom and open at one side, a door for closing the opening in the side, slice-clamping members carried by the door and adapted when the door is closed to support slices over the openings, means within the housing to toast or broil the slices thus supported, and means on the exterior of the housing to relieve the clamping pressure on the slices thereby to allow them to gravitate through said openings.

8. A device of the class described comprising a housing having openings in its bottom and open at one side, a door for closing the opening in the side, slice-clamping members carried by the door and adapted when the door is closed to support slices over the openings, means within the housing to toast or broil the slices thus supported, means on the exterior of the housing to relieve the clamping pressure on the slices thereby to allow them to gravitate through said openings, and means to apply butter to the slices during their gravitating movement.

9. A device of the class described comprising a housing having an opening in its bottom, slice-clamping means by which a slice is clamped and held in position over said opening, means to toast or broil the slice thus supported, means to relieve the clamping pressure, and means applying a downward force to said slice to initiate its gravitating movement through the opening.

10. An appliance for toasting or cooking food in slice formation comprising a housing having a plurality of unobstructed openings in its bottom, a spring-controlled slice-clamping device for supporting a slice stationarily in vertical position over each opening, means within the housing for toasting or broiling the slices while thus stationarily supported by the slice-clamping devices, and means common to all the slice-clamping devices to release the spring pressure on each device, thereby permitting the slices to gravitate through the various openings.

11. An appliance for toasting or cooking food in slice formation comprising a housing having a plurality of unobstructed openings in its bottom, a slice-clamping device for supporting a slice stationarily in vertical position over each opening, means within the housing for toasting or broiling the slices while thus stationarily supported by the slice-clamping means, means to release all the slice-clamping means simultaneously thereby permitting the slices to gravitate through the various openings, and slice-guiding means to deliver in superposed parallel relation the slices thus delivered through the various openings.

12. A device of the class described comprising a housing having openings in its bottom and also being open at one side, a door hinged to the housing to swing about a horizontal axis and adapted to close the opening in the side, slice-clamping members carried by the door and adapted when the door is closed to support slices over the openings, means within the housing to toast or broil the slices thus supported, and means carried by the door to relieve the clamping pressure on the slices simultaneously thereby to allow them to gravitate through said openings.

13. A device of the class described comprising a housing having openings in its bottom and also being open at one side, a door for closing the opening in the side, slice-clamping members carried by the door and adapted when the door is closed to support slices over the openings, means within the housing to toast or broil the slices thus supported, means carried by the door to relieve the clamping pressure on the slices thereby to allow them to gravitate through said openings, a receptacle beneath the openings, and slice-guiding means for guiding the slices to the receptacle and delivering them therein in superposed parallel relation.

14. An appliance for toasting or cooking food in slice formation, comprising a housing having a plurality of unobstructed openings in its bottom, a plurality of separate slice-clamping devices, one for each opening, each slice-clamping device comprising two clamping members between which a slice is clamped and a spring for yieldingly holding the clamping members of each device in clamping engagement with the slice, each slice-clamping device being operative to support a slice in vertical position over the corresponding opening, means within the housing for toasting or broiling the slices thus supported, and means common to all the clamping devices for compressing the springs and thus releasing the clamping engagement with the slices, each slice when released gravitating through its opening.

15. An appliance for toasting or cooking food in slice formation, comprising a housing having a plurality of unobstructed openings in its bottom, a plurality of separate slice-clamping devices, one for each opening, each slice-clamping device being operative to support a slice in vertical position over the corresponding opening, means within the housing for toasting or broiling the slices thus supported, means common to all the clamping devices for releasing their clamping engagement with the slices, and means normally applying a downward pressure on each slice to initiate its gravitating movement through the corresponding opening.

16. An appliance for toasting or cooking food in slice formation comprising a housing having a plurality of unobstructed openings in its bottom, a separate slice-clamping device for each opening, each slice-clamping device adapted to support a slice in vertical position over the corresponding opening, means within the housing for toasting or broiling the slices while thus supported, means common to all the slice-clamping means to release them, and means applying a downward pressure on each slice to initiate its gravitating movement through its opening when clamping pressure thereon has been released.

17. A device for making toasted sandwiches, comprising a housing having three unobstructed openings in its bottom, three slice-clamping devices, one for each opening, the central slice-clamping device being adapted to support a slice of meat over its opening and the other slice-clamping devices being adapted to support a slice of bread over their openings, means within the housing for toasting or broiling the slices thus supported and in so doing subjecting the slice of meat to a greater amount of heat than the slices of bread, means common to all the slice-clamping means to release the clamping pressure on the slices, thereby permitting them to gravitate through said openings, a receptacle below the openings, and slice-guiding means for guiding the slices into said receptacle in superposed relation with the meat slice between the bread slices.

18. A device of the class described comprising a housing having a plurality of openings in its bottom and also being open at one side, a door hinged to the housing and adapted to swing from a horizontal open position to a vertical position in which it closes the opening in the side, pairs of slice-clamping members carried by the door and adapted when the door is closed to support slices over the openings in the bottom, means within the housing to toast or broil the slices thus supported, means carried by the door for releasing the slice-clamping members, each pair of slice-clamping members having a supporting member associated therewith to support each slice when the door is in open position and the clamping members are released.

19. A device of the class described comprising a housing having unobstructed openings in its bottom and an opening in its side, a door hinged to the housing to swing from a horizontal open position into a vertical position in which it closes said opening in the side, a plurality of pairs of slice-clamping members carried by the door and adapted when the door is closed to support slices over the openings in the bottom of the housing each pair of slice-clamping members comprising a stationary member and a movable spring-pressed member, means within the housing to toast or broil the slices thus supported, means carried by the door to relieve the clamping pressure on the slices simultaneously, each pair of slice-clamping members having a supporting member associated therewith to support the slice when the door is in open position and the clamping pressure is released.

JOSEPH P. SPANG.